June 8, 1965 W. E. RAY ETAL 3,188,446
METHOD AND APPARATUS FOR ASSEMBLY OF NUCLEAR
CONTROL RODS AND FUEL TUBES
Filed Oct. 10, 1961 2 Sheets-Sheet 1
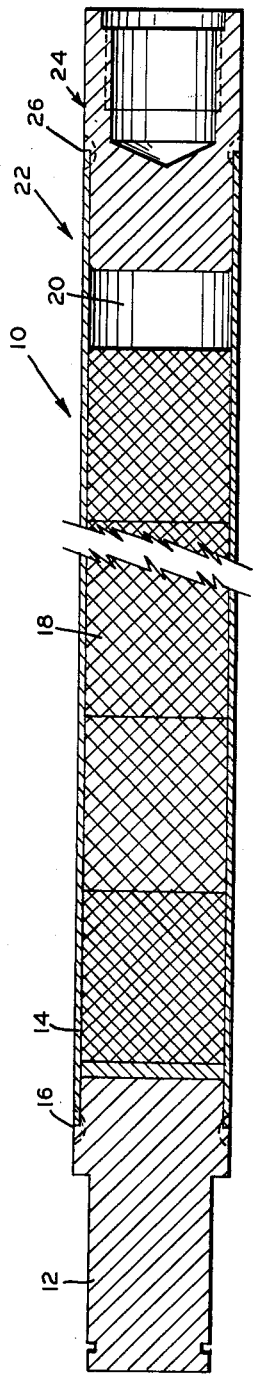
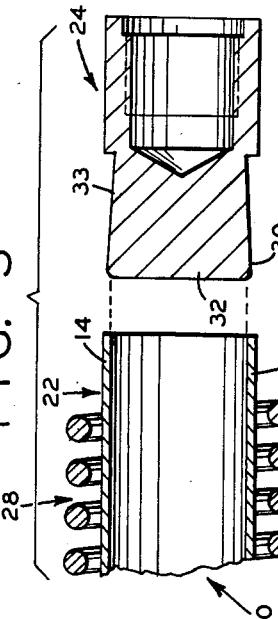
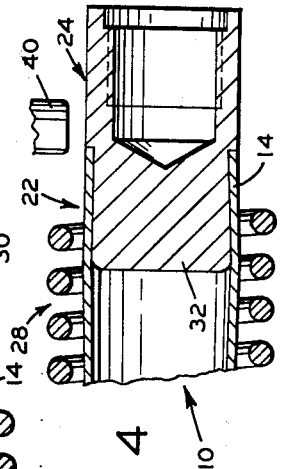
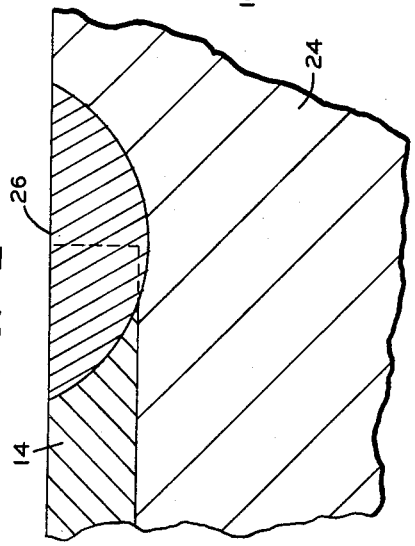
INVENTORS.
WILLIAM E. RAY
GEORGE R. DAVIS
BY
BLAIR AND BUCKLES
ATTORNEYS.

June 8, 1965
W. E. RAY ETAL
3,188,446
METHOD AND APPARATUS FOR ASSEMBLY OF NUCLEAR
CONTROL RODS AND FUEL TUBES
Filed Oct. 10, 1961
2 Sheets-Sheet 2
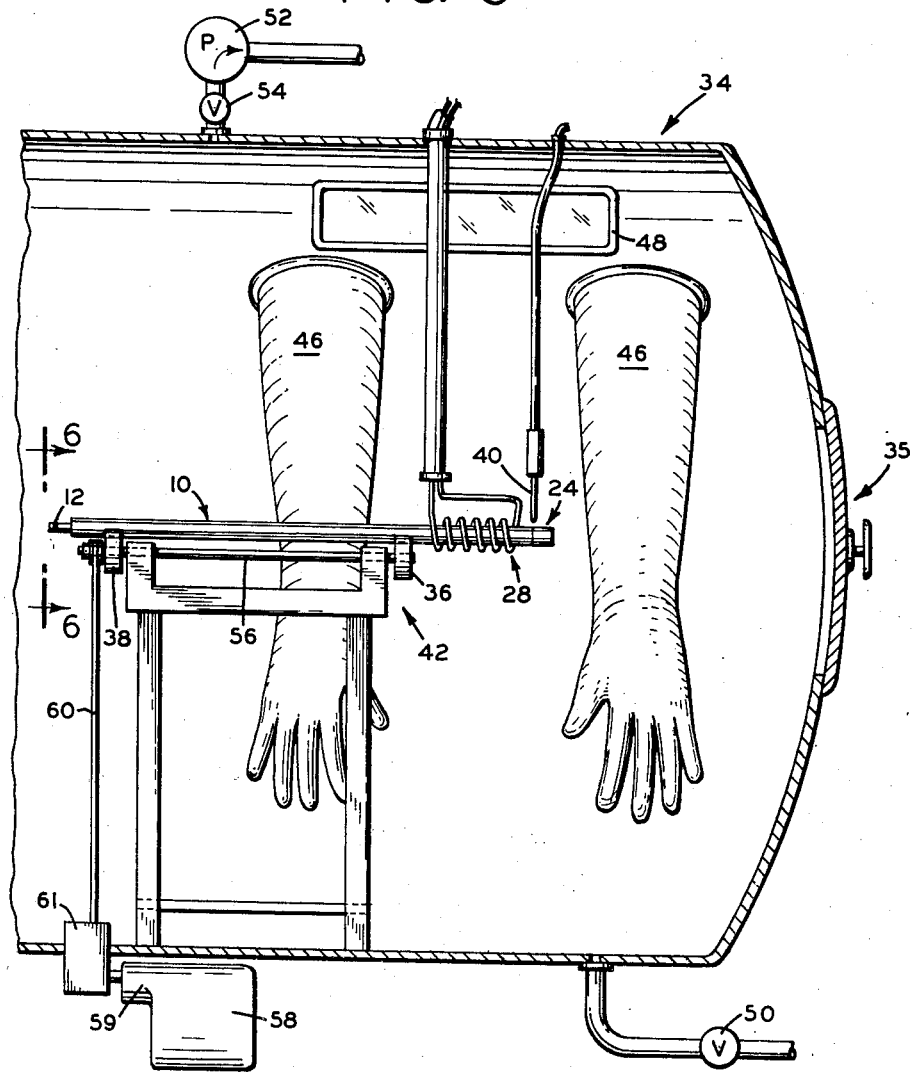
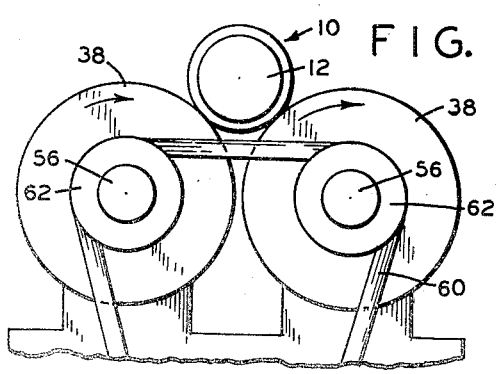
INVENTORS.
WILLIAM E. RAY
GEORGE R. DAVIS
BY
BLAIR AND BUCKLES
ATTORNEYS.

United States Patent Office 3,188,446
Patented June 8, 1965

3,188,446
METHOD AND APPARATUS FOR ASSEMBLY OF NUCLEAR CONTROL RODS AND FUEL TUBES
William E. Ray and George R. Davis, Great Barrington, Mass., assignors, by mesne assignments, to the United States of America as represented by the United States Atomic Energy Commission
Filed Oct. 10, 1961, Ser. No. 144,162
8 Claims. (Cl. 219—72)

This invention relates to methods and apparatus for the assembly and sealing of tubular casings and more particularly, to the encapsulation of nuclear control material or nuclear fuels by welding.

The core of a nuclear reactor contains a number of nuclear fuel elements for the generation of heat by controlled nuclear reaction. There are also associated with the reactor core a number of control rods, used to control the rate of nuclear reaction. The control rods are also used to shut down the reactor when desired and in emergencies the control rods are dropped or driven rapidly into the core to stop the chain reaction. Such emergencies are known as "scram" situations.

As is well known in the art, each fuel element contains a number of fuel tubes, containing $UO_2$ or some other suitable nuclear fuel. There may be, for example, fifty fuel elements per core with four hundred fuel tubes per element; thus, a typical reactor may have a total of twenty thousand or more fuel tubes in its core.

The core described above may also have, for example, fifteen control rods with each control rod holding one hundred tubes containing control materials, such as dysprosium, europium or other rare earth oxides. Thus, in a typical reactor there may be 1,500 tubes of control material.

The nuclear fuel and control materials are usually loaded into the tubes in the form of cylindrical ceramic pellets that fit closely on the insides of the tubes. After the tubes are loaded with fuel or control material, they must then be sealed very reliably so that the danger of leaking in operation is minimized. A leak in a fuel tube, for example, would result in dangerous dispersions of radioactive material into the reactor coolant or heat transfer medium. Leaking of a tube containing control material will also contaminate the heat exchange medium surrounding the core. Contamination from a control tube will "poison" the cooling water of the reactor and prevent or at least hinder operation of the reactor.

The problems of effective sealing of these tubes is intensified because of the high temperatures and pressures to which they are subjected in the reactor core. Typical primary water temperatures in the core are 600 to 700 degrees Fahrenheit with pressures from 2,000 to 3,000 p.s.i. Thus, even a very small leak in a fuel tube or control tube may result in the water flashing to steam within the tube and bursting it, thus exposing great amounts of fuel or control material to the primary heat-exchange medium of the reactor.

Another very serious problem is created by the possible bursting of the control rod tubes. Loss of reactor control by jamming of the control rods can readily be appreciated as being a dangerous situation. Thus it can be seen that the effective sealing of these tubes is of paramount importance, for any leakage of the tubes is not only dangerous but is also very expensive to cure once the reactor is set in operation.

Heretofore, such tubes have been assembled and sealed by welding an end plug on one end, loading the tube with ceramic pellets, and then sealing the tube by welding a second end plug to the open end of the tube. It is this second closure welding of the tube that presents a number of problems.

Great difficulty has been encountered in achieving an effective weld of the second end plug with prior methods. As pointed out above, it is imperative that the weld between the end plug and tube be uniform, nonporous to provide an effective, long-lasting seal for the material inside the tube. One of the principal problems in attempting to close the tube by welding generally occurs just as the tube is finally sealed. As the last opening is being welded, there is a build-up of gas pressure within the tube due to the heat transmitted from the welding arc, and this gas pressure escapes through the molten weld puddle as the sealing weld is being completed. Thus, the final weld puddle may have a small hole or holes therethrough, which is intolerable if the tube is to be used in a nuclear reactor. Further, the escaping gas from the inside of the tube invariably carries with it some ceramic dust, which coats the small hole or holes in the weld. In rewelding the tube to seal it, these impurities cause porosity in the weld or at best result in bubbling of the molten weld puddle resulting in a very thin-walled weld. Any of these conditions make the tube unacceptable for use in a reactor.

Accordingly, it is a principal object of this invention to provide a process for effectively encapsulating nuclear materials.

Another object of the invention is to provide a process of the above character, in which the tubes containing the material are uniformly and safely sealed at the end plugs of the tube.

A further object of the invention is to provide a process of the above character in which the pressure of the gas within the tube is reduced before the tube is sealed by welding.

Another object of the invention is to provide a process of the above character wherein the open end of the tube is heated prior to the application of welding heat to the end plug and tube.

A further object of the invention is to provide a process of the above character wherein the end plug provides a preliminary pressure seal for isolation of gas in the tube during welding.

Another object of the invention is to provide a process of the above character which is useful in the manufacture of tubes for nuclear control materials and nuclear fuel.

A further object of the invention is to provide apparatus for carrying out processes of the above character.

Another object of the invention is to provide processes and apparatus of the above character which are inexpensive in practice, fabrication and use.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which:

FIGURE 1 is a fragmentary longitudinal section of a sealed tube containing ceramic pellets of nuclear material;

FIGURE 2 is a greatly enlarged fragmentary sectional view of the sealing weld at one end of the tube shown in FIGURE 1;

FIGURE 3 is an enlarged fragmentary exploded sectional view of the tube end and end plug prior to final assembly and welding;

FIGURE 4 is an enlarged fragmentary sectional view of the assembled tube end prior to welding;

FIGURE 5 is a fragmentary schematic view partially in section of apparatus used in sealing the tube shown in FIGURE 1.

FIGURE 6 is a partial view of the tube rotating apparatus taken along line 6—6 of FIGURE 5.

Similar reference characters refer to similar parts throughout the drawings.

In general, the tube 10, as shown in FIGURE 1, is closed at one end by an end plug 12, the end plug being welded to the tubular casing 14 by a weld 16. Cylindrical pellets 18 of nuclear fuel or control materials are then loaded into the tube leaving a small air space 20 at the end 22 of the tube. End plug 24 is then inserted into the tube end 22 and weld 26 seals plug 24 to the tube, as will be more fully explained hereinafter.

As shown in FIGURE 2 the welding 26 should extend to a depth equal to or greater than the thickness of the wall of casing 14 and the weld should be free from holes, porosity, bubbles or like defects. As pointed out above, the welding problem is created by expansion of gas in the space 20 (FIG. 1) which tends to blow out the molten weld 26 when heat is applied to the end plug 24 and tube wall 14. This may occur at any stage during welding of end cap 24 and, as pointed out above, end plug 24 may be pushed outwardly from the end of the tube or as is generally the case the final attempted sealing of the tube causes a small hole or holes to be blown in the molten weld.

To obviate this difficulty, our invention provides for a preheating of the end 22 by a heating coil 28 as shown in FIGURES 3, 4, and 5, whereby the density of the gas within the tube 10 is reduced before the insertion of the end plug 24. Thus the heat applied during welding does not appreciably increase the gas pressure in the tube, and the problems of gas pressure affecting the sealing weld are greatly lessened.

A presealing end plug is provided by a straight interference fit or by a slight reverse taper 30 around the inserted end 32 of the plug 24, as shown. Thus, upon preheating of end 22 to reduce the density of gas inside the tube, plug end 32 is inserted into the tube, current to the coil 28 is cut off and cooling of the tube casing 14 shrink fits the tubing tightly around end 32 of the plug 24. The weld is then effected on the pre-sealed tube-plug assembly. The welding electrode is so positioned that the end plug absorbs most of the input as the molten weld puddle is formed.

FIGURES 5 and 6 illustrate the apparatus used in carrying out the process of the invention. The welding is carried out in a tank 34 with the tube 10 supported by a tube turning apparatus 42 for rotating the tube within the coil 28 and under the welding electrode 40. Although two pairs of rotating wheels 36, 38 are shown, any suitable tube turning holder, such as a chuck, may be used.

More particularly, the tubes are loaded with material, as pellets, powder, or in some other suitable form. The spaces in the tube, such as space 20 in FIG. 1, are filled with an inert gas. Helium is most frequently used for this purpose, since it will leak readily due to its small molecule and can be easily detected. Thus, an unreactive atmosphere is provided for the material and tube leaks can be readily detected by the leaking helium.

Referring now to FIGURE 5, it will be seen that the tank 34 encloses the rotating tube support mechanism 42, the heating coil 28, and electrode 40. Initially a number of tubes may be placed inside the tank 34 via hatch 35 and are handled inside the tank manually through a pair of full length rubber "gloves" 46, which extend into the tank. A window 48 is provided for the operator. Hatch 35 and valve 50 are closed and pump 52 exhausts air from the tank through open valve 54 until a high vacuum in the tank is achieved. Valve 54 is then closed, and the tank is back-filled through valve 50 with helium until the helium in the tank is at approximately atmospheric pressure. Exhaustion of air and the back-filling with an inert atmosphere removes impurities and the deleterious effects of oxidation during the tube welding process. A tube which has been filled with material and closed at one end is then placed in the tube turning apparatus 42, with its open end positioned within the coil 28, and is supported by two pairs of rotatable wheels 36, and 38, as shown in FIGURE 5. The wheels are supported in shafts 56 (FIGURE 6), which may be turned by a small motor 58 (outside the tank), through gear reduction 59 and a sealed drive 61 which turns pulleys 62 by a belt 60 as shown in FIGURE 5. If a chuck arrangement is used, it may be driven through a similar sealed drive 61, as is well known in the art.

With the tube 10 now positioned in the coil 28, and supported for rotation on the wheels 36, 38, current is applied to the coil 28 to heat the tube at end 22 prior to welding. When the end of the tube 22 becomes suitably heated, the end plug 24 is inserted into the tube. The end plug and tube are cooled and then arc-welded together as they are turned under electrode 40 with the electrode delivering the majority of the welding heat to the end plug as the tube and end plug are rotated under the electrode.

As shown in FIGURES 3 and 4 the end plugs 24 may be provided with a slightly reversed taper 30 of up to approximately 5 degrees (exaggerated in the drawings). In other words, the end 32 of plug 24 has a greater diameter than that of portion 33. When using the end plug with such a reverse taper, it is preferable to cut or reduce the current to coil 28 and allow the tube wall 14 to cool to shrink fit the tube around end portion 32. Further, when using such reverse taper, the weld is made while end 22 of the tube 10 has a tight pressure seal because of the shrink fitted plug 24.

It has been found that tubes made of a number of metals, including stainless steels, zirconium, and zirconium alloys can be effectively sealed by welding with the above apparatus and processes. The tube material of course varies with the use to which tube is put, i.e., as a fuel tube or a control material tube. The above examples of materials are illustrative, for the invention may be utilized with tubes made of other weldable material. It should also be understood that other inert gases may be used instead of helium, which is merely an illustrative example, and the invention is not limited thereto.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. The process of sealing a container by welding, comprising the steps of
    (A) preheating the container casing in the open area to be sealed
        (1) to a temperature approximating that of the container material under welding heat to expand the opening, (B) preliminarily sealing the container
  (1) by inserting a closely fitting plug into the preheated, expanded open area, and then
(C) sealing the plug to the container by welding, whereby gas density in the container is reduced by preheating and welding heat expands the plug more than the open area of the container to retain a container pressure seal during the welding step.

2. The process defined in claim 1 wherein the preheated container is cooled slightly to shrink fit the container more tightly around the plug before welding.

3. The process defined in claim 1 wherein the process is carried out in an inert atmosphere.

4. The process of sealing a container with a plug, comprising the steps of
  (A) preheating the container
    (1) in the area of the opening to receive the plug
    (2) to a temperature approximating that of the plug and container under welding heat,
  (B) inserting a closely fitting plug into the heated container opening,
  (C) cooling the preheated container sufficiently to tightly shrink fit the container around the plug, and then
  (D) welding the plug to the container
    (1) by moving the container and plug relative to the source of welding heat
    (2) with the majority of the welding heat applied to the plug
whereby preheating the container reduces the gas density in the container and expands the container to provide a tight shrink fit between the container and plug when the container is cooled and the application of welding heat causes expansion of the plug during the weld sealing thereof to retain a gas tight interference fit between the plug and container as they are welded together.

5. The process defined in claim 4 wherein the welding heat is applied by arc welding.

6. The process of sealing materials within a tubular container wherein an end plug is welded to a tubular casing, comprising the steps of
  (A) preheating the open end of the container casing to be sealed
    (1) to a temperature wherein the open end is expanded to receive a slightly oversized plug,
  (B) inserting an end plug into the open end of the casing while the casing is expanded by heat,
    (1) the end plug being closely fitting within the expanded open end of the casing,
  (C) cooling the casing sufficiently to shrink fit the tube end tightly around the plug,
  (D) and then sealing the container by welding
    (1) with the application of the majority of welding heat to the end plug,
whereby gas density in the casing is reduced by preheating the tube end and the end plug is expanded by the application of welding heat to retain a tight fit with the cooled casing during welding to prevent disruption of the molten weld puddle by gas from within the casing.

7. The process of assembling and sealing a tube containing materials comprising the steps of
  (A) sealing one end of the tube casing,
  (B) filling the tube with material through the open end thereof,
  (C) removing air from around and within the tube,
  (D) replacing the removed air with an inert gas atmosphere,
  (E) heating the open end of the tube
    (1) to a temperature approximating welding temperature to expand the tube end and reduce the density of gas therein,
  (F) inserting a closely fitting end plug into the heated tube end,
  (G) cooling the tube end sufficiently to tightly shrink fit the tube end to the end plug, and then
  (H) welding the end plug to the tube casing,
    (1) with the majority of the welding heat being absorbed by the end plug,
whereby gas density within the tube is reduced by preheating the tube end and gas is prevented from disrupting the weld puddle during welding by the tightly fitted plug.

8. The process defined in claim 7 wherein the tube and end plug are rotated relative to an arc welding electrode during the welding step.

References Cited by the Examiner

UNITED STATES PATENTS

| | | | |
|---|---|---|---|
| 2,265,954 | 12/41 | Quartz | 219—137 |
| 2,315,358 | 3/43 | Smith | 219—137 |
| 2,484,613 | 10/49 | Detuno | 219—9.5 X |
| 2,798,927 | 7/57 | Lefcourt et al. | 219—9.5 |
| 2,807,697 | 9/57 | Brauer et al. | 219—9.5 |

FOREIGN PATENTS 527,728  7/56  Canada.

RICHARD M. WOOD, *Primary Examiner.*

MAX L. LEVY, CHESTER L. JUSTUS, *Examiners.*